United States Patent [19]

McPherson

[11] Patent Number: 5,449,148
[45] Date of Patent: Sep. 12, 1995

[54] LEVELLING DEVICE

[76] Inventor: B. J. McPherson, 443 Mason Rd., Medina, Tenn. 38355

[21] Appl. No.: 204,774

[22] Filed: Mar. 2, 1994

[51] Int. Cl.⁶ ............................................. B25B 1/08
[52] U.S. Cl. .................................................. 254/104
[58] Field of Search ............... 254/104; 269/234, 217, 269/243; 52/116, 749

[56]  References Cited

U.S. PATENT DOCUMENTS

| | | | |
|---|---|---|---|
| 3,078,072 | 2/1963 | Golden | 254/104 |
| 4,208,045 | 6/1980 | Rowe et al. | 254/104 |
| 4,824,303 | 4/1989 | Dinger | 254/104 |

FOREIGN PATENT DOCUMENTS

| | | | |
|---|---|---|---|
| 1551408 | 8/1979 | United Kingdom | 254/104 |
| 623819 | 2/1978 | U.S.S.R. | 254/104 |

*Primary Examiner*—Robert C. Watson
*Attorney, Agent, or Firm*—Baker, Donelson, Bearman & Caldwell

[57] ABSTRACT

A levelling apparatus for use between a structural frame member defining a first plane and a supporting member defining a second plane, vertically adjustable between raised and lowered positions, comprising a base section having first and second inclined surfaces, a top section having first and second inclined surfaces, and first and second pairs of half wedge members disposed intermediate the base and top section, the half wedge members having inclined faces mating with the complementary surfaces formed on the base and top section. A threaded rod is disposed longitudinally within the levelling device, passing through the pairs of half wedges members and brackets engaging the back sides of the half wedge members, with nuts threadingly engaging each end of the threaded rod. Rotation of one or both nuts causes longitudinal translation of the half wedge members and resulting vertical adjustment of the levelling device. The half wedge members are pivotable about lateral pivot pins, so that substantially constant contact is maintained between the top and base section when the base section is tilted due to an inclined support surface. Braces secured to the opposite ends of the pivot pins cooperate with the brackets to prevent lateral displacement of the components. The top section is angularly adjustable relative to the base section to compensate for an uneven support surface.

7 Claims, 3 Drawing Sheets

LEVELLING DEVICE

BACKGROUND OF THE INVENTION

1. Field

This invention relates to levelling devices and, more particularly, to such devices used for permanent installation between a structural frame member, such as in a mobile home, and the supporting foundation, especially when the foundation rests on uneven terrain.

2. Description of the Prior Art

Lifting and levelling devices utilizing a pair of slidable wedges are well known. U.S. Pat. No. 3,078,072 entitled "Levelling Device for Derricks", issued Feb. 19, 1963, for example, discloses a device having a pair of wedge members with oppositely threaded holes formed therethrough. A screw shaft passes through the wedge members and engages the threaded holes, so that rotation of the shaft causes the wedge members to diverge when turned in one direction, and converge when turned in the opposite direction. Movement of the wedge members causes the lift section to move upward or downward, depending upon the direction the shaft is rotated. The device shown in the '072 patent, however, does not include any provision for accommodating non-parallel surfaces.

Russian Patent No. 623,819 published Aug. 2, 1978 to inventor Kurbatov discloses a lifting and centering device having top and base portions with inclined surfaces formed thereon, and wedge members slidably disposed therebetween. Each wedge member includes a central pivot pin having a threaded hole formed therethrough, one such hole having right hand screw threads and the other having left hand screw threads, interconnected by a central threaded shaft. As with the '072 levelling device mentioned above, rotation of the shaft causes the wedges to move in opposite directions, either converging or diverging, resulting in vertical adjustment of the device. The Russian device is also capable of accommodating misalignment between the supporting surface and structure being supported, as the top and base portions are angularly adjustable relative to one another.

The use of a rotating shaft having both left and right hand screw threads, as with the above described devices, has been found to have certain disadvantages. First, threaded rods of this nature are relatively expensive when compared to a conventional threaded rod having only right hand screw threads. Second, this arrangement requires that both wedge members move concurrently, and does not allow the user to adjust the position of one wedge member without moving the other. Additionally, the threaded pivot pins in the Russian '819 device are susceptible to dislocation in either the longitudinal or lateral direction due to the forces generated by the wedges and the threaded rod. The wedges are also susceptible to dislocation, making the device unsafe for continuous usage in permanent installations, such as beneath a mobile home.

BRIEF SUMMARY OF THE INVENTION

It is an object of this invention to provide a levelling device for use between a structure and a support foundation which will compensate for angular misalignment therebetween.

It is a further object of this invention to provide such a levelling device which is stable enough for use in permanent, or semi-permanent, installation.

In order to achieve these and other objects, the present invention comprises substantially identical top and base sections having oppositely inclined surfaces formed on the inner portions thereof. A first and second pair of half wedge members are disposed intermediate the top and base sections, and include top and bottom inclined faces abutting the inclined surfaces of the top and base sections. Each pair of half wedge members has a pivot pin laterally disposed therein, and a bracket engaging the back sides of the half wedge members. A conventional threaded rod is disposed longitudinally through the levelling device, with opposite ends extending through holes formed in the brackets. A nut is threadingly engaged on each end of the threaded rod, bearing on each bracket. Tightening one or both of the nuts drives the half wedge members together, thereby extending the levelling device to its raised position. The top and base sections of the device are angularly adjustable relative to one another, with the half wedge members pivoting to maintain substantially constant contact with the top and base portions during angular adjustment thereof.

Other objects and advantages provided by the present invention will become apparent to those skilled in the art upon reading the following detailed description, in conjunction with the appended drawings.

DETAILED DESCRIPTION OF THE PREFERRED EMBODIMENT

In the appended drawings, levelling device 10 is shown in use supporting a generic structural member 12 in the form of a conventional I-beam defining a first plane, on top of a concrete block 14 defining a second plane. In the preferred embodiment disclosed herein, structural member 12 is representative of the structural beam in a typical mobile home, which is ordinarily supported by concrete blocks. While levelling device 10 was developed primarily for use beneath the structure of a mobile home, its potential uses are clearly not so limited. It is to be understood that the advantages provided by levelling device 10 will be appreciated in a wide variety of situations requiring the support of a structural member.

Figure 1:
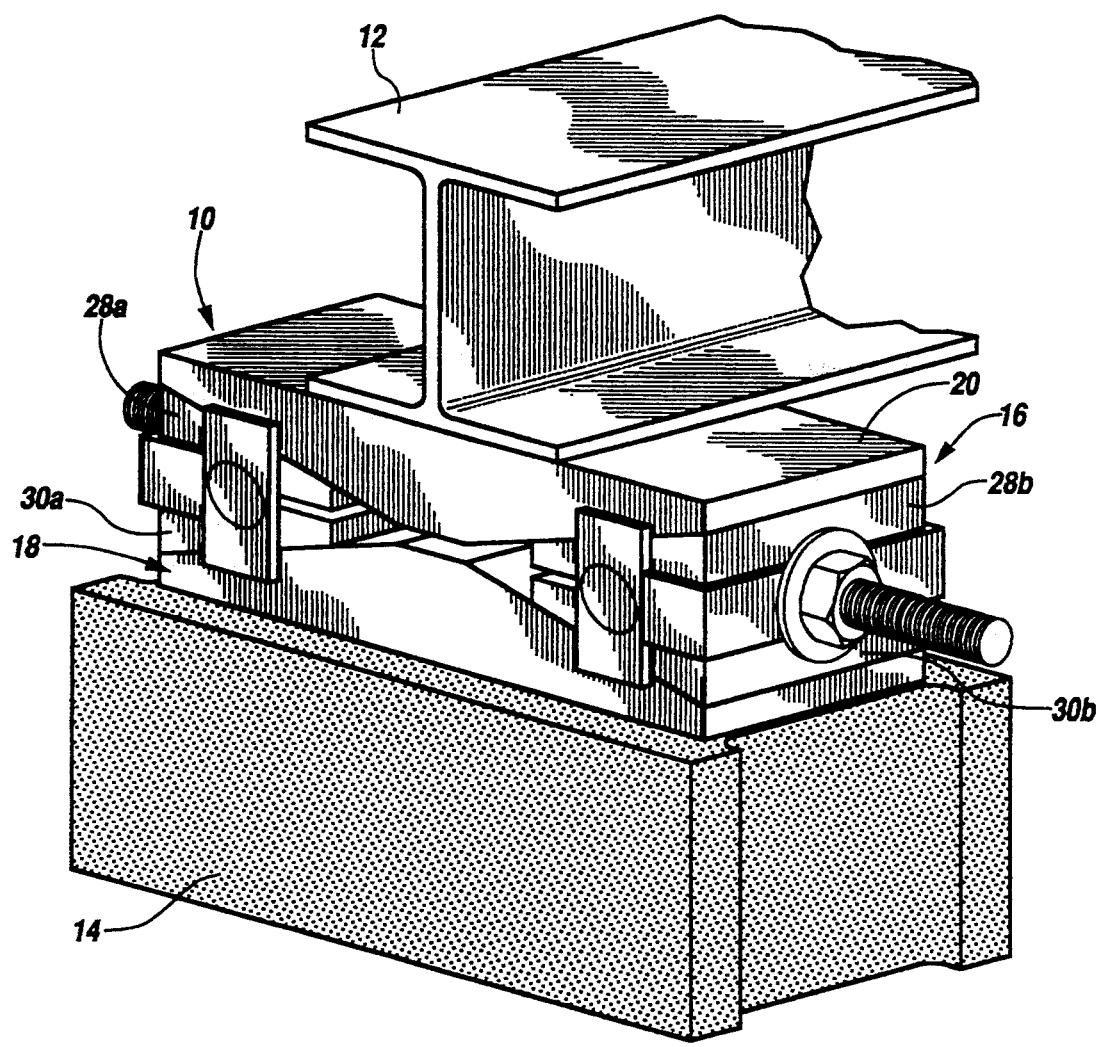
FIG. 1 is a top, side perspective view of the levelling device of this invention installed between a representative frame member and a support block.
Figure 2:
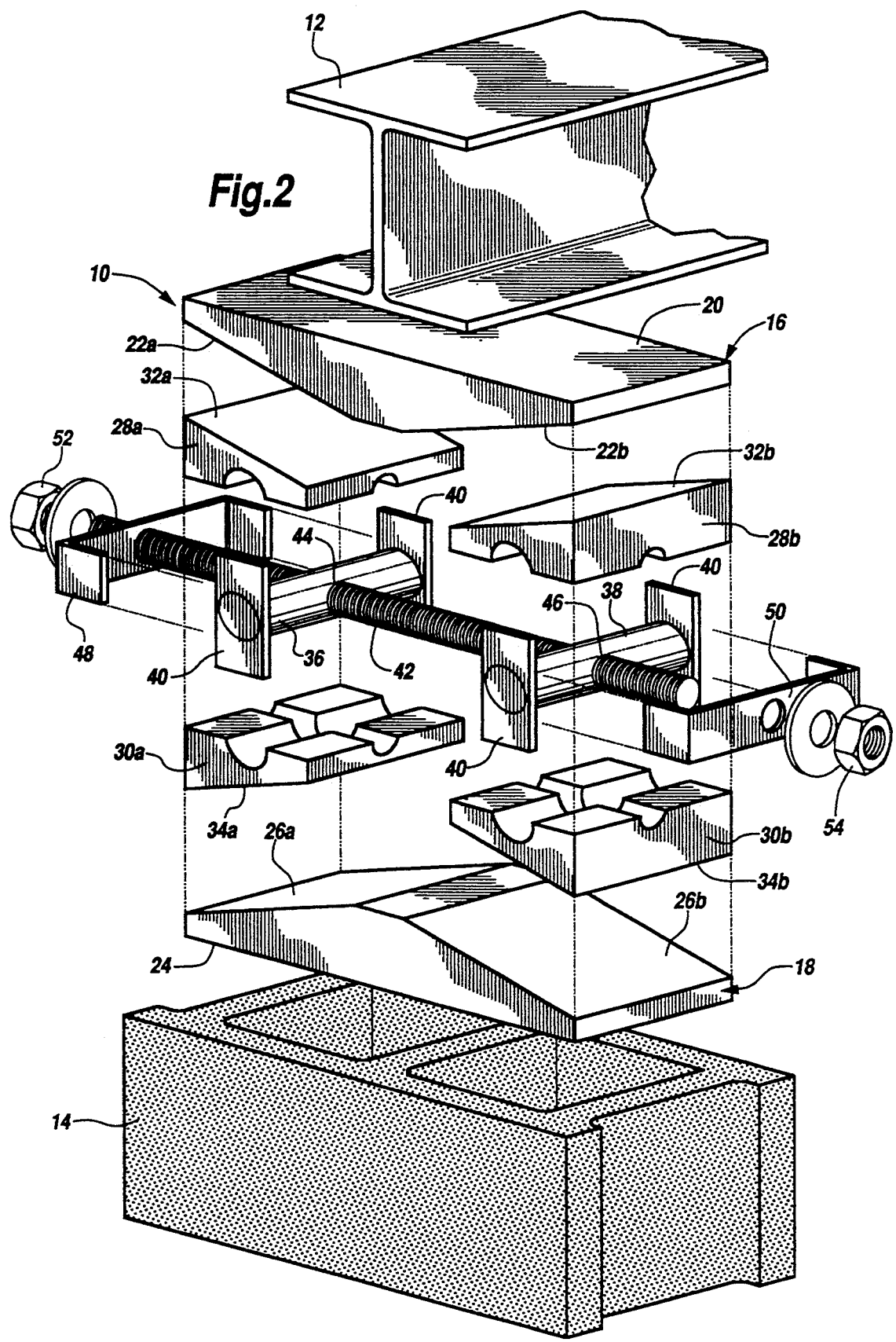
FIG. 2 is an exploded perspective view of the device shown in FIG. 1.

Referring now to FIGS. 1 and 2, levelling device 10 is seen to comprise a top section 16 and a base section 18, one being essentially identical to the other in an inverted orientation. Top section 16 includes a generally planar upper surface 20 adapted to support structural member 12, and a lower surface comprising oppositely inclined surfaces 22a and 22b. Similarly, base section 18 comprises a lower planar surface 24 adapted to rest on block 14, and an upper surface comprising oppositely inclined surfaces 26a and 26b.

Disposed intermediate top section 16 and base section 18 are a first pair of half wedge members 28a and 30a, and a second pair comprising half wedge members 28b and 30b. In the preferred embodiment shown, half wedge members 28a, 30a, 28b and 30b are identical, interchangeable components, as are top section 16 and base section 18 discussed above. Accordingly, it is to be understood that any feature discussed in connection with one half wedge member is generally applicable to all four half wedge members.

Half wedge members 28a and 28b include inclined top faces 32a and 32b, configured to slidably engage inclined surfaces 22a and 22b, respectively. Similarly, half wedge members 30a and 30b include inclined bottom faces 34a and 34b configured to slidably engage inclined surfaces 26a and 26b of base section 18.

Each half wedge member is pivotable about an axis defined by pivot pins 36 and 38, with pin 36 being disposed intermediate half wedge members 28a and 30a, and pin 38 being disposed intermediate half wedge members 28b and 30b upon assembly of levelling device 10. Pivot pins 36 and 38 include a brace 40 secured to each end thereof. Braces 40 extend vertically closely adjacent a side portion of half wedge members 28a, 28b, 30a and 30b, as well as top section 16 and base section 18, thereby preventing lateral displacement of the components during use. A threaded rod 42 is longitudinally disposed within levelling device 10, passing through clearance holes 44 and 46 and pivot pins 36 and 38. A pair of brackets 48 and 50 engage a portion of the back and side surfaces of half wedge members 28a, 30a, and 28b and 30b, respectively, and are secured in position by nuts 52 and 54. The angled ends of brackets 48 and 50 provide additional resistance to lateral displacement of the half wedge members.

It will be readily understood by those skilled in the art that vertical adjustment of levelling device 10 is effected upon rotation of one or both of nuts 52 and 54. In the embodiment shown, clockwise rotation of either nut 52 or nut 54 causes brackets 48 and 50 to converge, resulting in longitudinal translation of half wedge members 28a, 30a and 28b, 30b. The resulting force generated upon convergence of the pairs of half wedge members drives top section 16 upward relative to base section 18. Counterclockwise rotation of either nut 52 or nut 54 reverses the process, allowing top section 16 to be lowered as the pairs of half wedge members diverge.

It should be noted that, in contrast with prior art levelling devices, vertical adjustment of levelling device 10 is accomplished with minimal horizontal load being placed on pivot pins 36 and 38. The longitudinal compressive load placed on the two pairs of half wedge members upon tightening nuts 52 an 54 is transmitted through brackets 48 and 50 onto the back sides of the half wedge members. By exposing pivot pins 36 and 38 to vertical forces almost exclusively, levelling device 10 greatly reduces the risk that either pin 36 or pin 38 will become inadvertently dislodged during use. Furthermore, the angled end sections of brackets 48 and 50 engage the sides of the half wedge members, and cooperate with braces 40 to prevent lateral movement of the half wedge members. The structural rigidity provided by levelling device 10 provides enhanced safety, which is particularly important when used beneath a mobile home.

Figure 3:
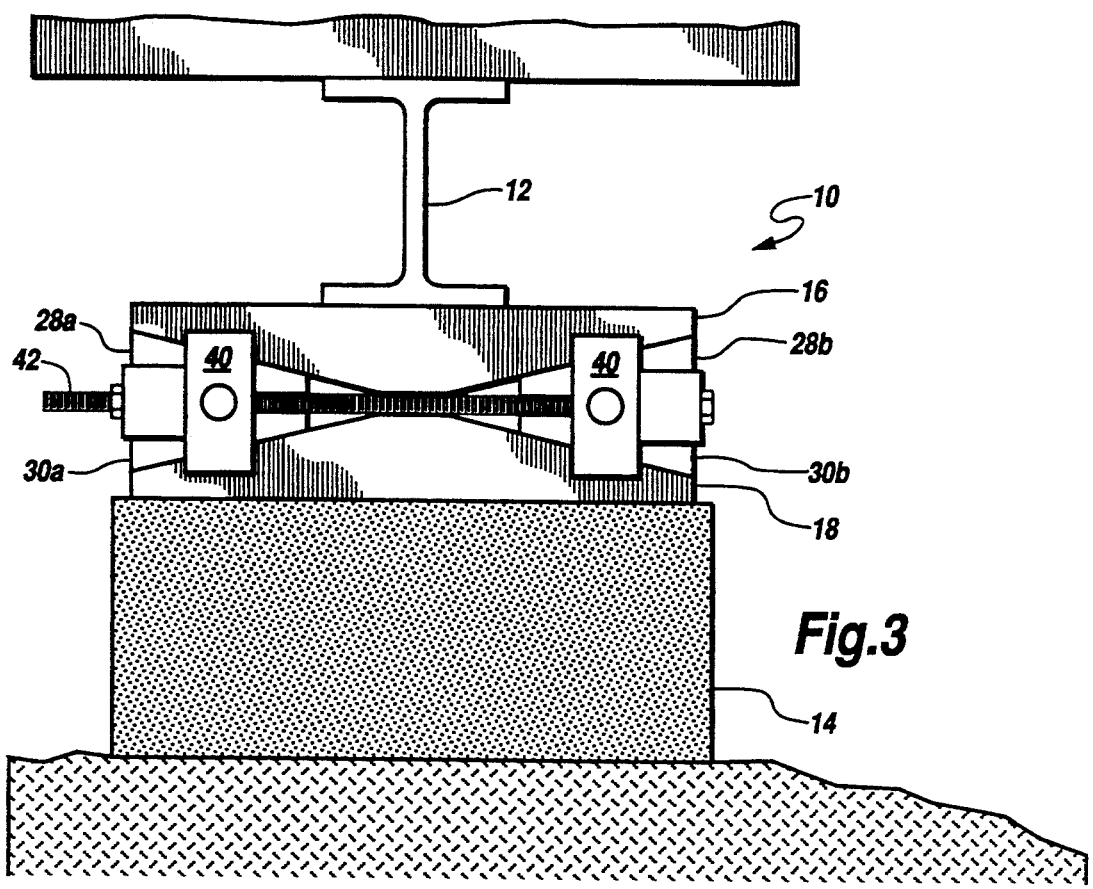
FIG. 3 is a side perspective view of the device shown in FIG. 1.
Figure 4:
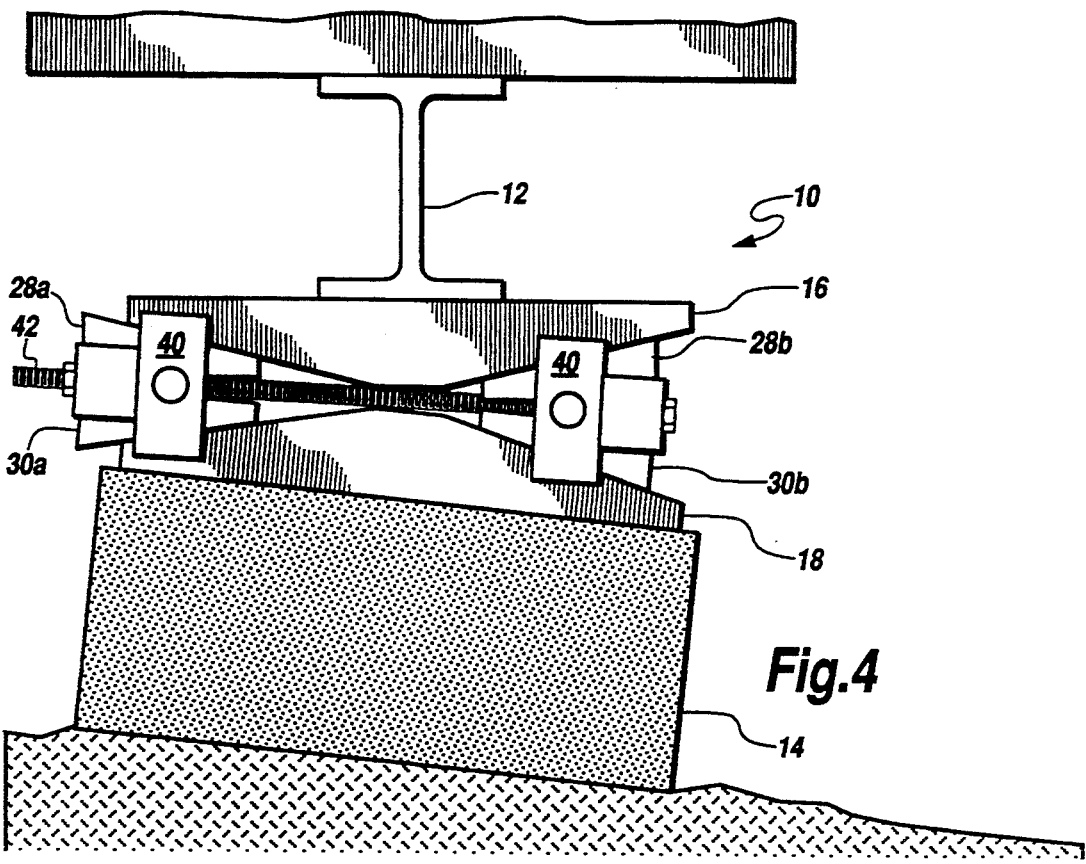
FIG. 4 is a side perspective view similar to FIG. 3, showing the levelling device installed on an inclined foundation block.

One of the most beneficial aspects of levelling device 10 is seen in FIGS. 3 and 4. FIG. 3 illustrates the configuration of levelling device 10 when the ground and concrete block 14 are substantially level. FIG. 4, on the other hand, illustrates the unique ability of levelling device 10 to compensate for sloping terrain, wherein concrete block 14 is disposed on an incline. When the plane defined by the top of concrete block 14 is not parallel to the plane defined by the bottom of structural member 12, base section 18 tilts accordingly so that lower surface 24 maintains a substantially constant contact surface with concrete block 14 to prevent inadvertent slipping. Under such circumstances, half wedge members 28a, 28b, 30a and 30b pivot slightly about pivot pins 36 and 38 so that top faces 32a and 32b maintain substantially constant contact with inclined surfaces 22a and 22b, and bottom faces 34a and 34b maintain substantially constant contact with inclined surfaces 26a and 26b. By maximizing the surface contact between the inclined surfaces and the top and bottom faces of the half wedge pairs, the structural integrity of levelling device 10 is insured, even when vertical adjustment is necessary on an uneven support surface. The structural integrity of levelling device 10 is further enhanced by the resistance to lateral dislocation effected by braces 40 and brackets 48 and 50, and by virtue of the fact that pivot pins 36 and 38 are subjected to minimal horizontal forces.

While the principles of a levelling device specially adapted for use on an inclined surface have been made clear from the above detailed description, it will be apparent to those skilled in the art that numerous changes may be made in the preferred embodiment without departing from the spirit and/or scope of this invention. Accordingly, the scope of coverage provided by this patent is to be limited only by the following claims and the prior art:

What is claimed is:

1. A levelling apparatus for use between a structural frame member defining a first plane and a support member defining a second plane, vertically adjustable between raised and lowered positions, comprising:

a base section having a lower surface adapted to rest on said support member, and an upper surface having first and second inclined surfaces;

a top section having an upper surface adapted to support said frame member, and a lower surface having first and second inclined surfaces, said top section being substantially identical to said base section, in inverted orientation, said top section being angularly adjustable relative to said base section to at least partially compensate for angular misalignment between said first and second planes;

a first pair of half wedge members having front and back sides, disposed intermediate said first inclined surfaces of said base section and said top section, said half wedge members having oppositely inclined top and bottom faces abutting said first inclined surfaces of said top section and said base section, respectively;

a second pair of half wedge members having front and back sides, disposed intermediate said second inclined surfaces of said base section and said top section, said second pair of half wedge members having oppositely inclined top and bottom faces abutting said second inclined surfaces of said top section and said base section, respectively;

first and second brackets engaging said back sides of said first and second pairs of half wedge members, respectively; and means for longitudinally translating said first and second brackets relative to said top and base sections, said translation effecting longitudinal movement of said half wedge members and consequential vertical adjustment of said levelling apparatus, longitudinal movement of said first and second pairs of half wedge members causing said top section to move vertically relative to said base section.

2. A levelling device as set forth in claim 1, wherein:
said first and second pairs of half wedge members each includes a laterally oriented pivot pin disposed therein, each said pair comprising an upper half wedge member and a lower half wedge member, said upper and lower half wedge members being independently pivotable about their respective pivot pin, whereby
said inclined top faces of said upper half wedge members maintain substantially constant areas of contact with said first and second inclined surfaces of said top section, and said inclined bottom faces of said lower half wedge members maintain substantially constant areas of contact with said first and second inclined surfaces of said base section.

3. A levelling device as set forth in claim 2, wherein:
said top section is angularly adjustable relative to said base section to compensate for any angular orientation of said first plane relative to said second plane, such that the upper surface of said top section remains substantially horizontal.

4. A levelling device as set forth in claim 1, wherein said translating means comprises:
a threaded rod longitudinally disposed intermediate said half wedge members, having a first end extending through an opening in said first bracket and a second end extending through an opening in said second bracket; and
first and second nuts threadingly engaged on said first and second ends of said rod, whereby tightening and loosening one of said nuts causes said first and second pairs of half wedge members to converge and diverge, respectively.

5. A levelling device as set forth in claim 1, further comprising:
means for restricting lateral movement of said first and second pairs of half wedge members relative to said top and base sections.

6. A levelling device as set forth in claim 2, further comprising:
a plurality of brace members secured to opposite ends of said pivot pins, said brace members being disposed closely adjacent side portions of said half wedge members and said top and base sections, thereby preventing lateral dislocation of said half wedge members.

7. A levelling apparatus for use between a structural frame member defining a first plane and a support member defining a second plane, vertically adjustable between raised and lowered positions, comprising:
a base section having a lower surface adapted to rest on said support member, and an upper surface having first and second inclined surfaces;
a top section having an upper surface adapted to support said frame member, and a lower surface having first and second inclined surfaces, said top section being substantially identical to said base section, in inverted orientation,
said top section being angularly adjustable relative to said base section to at least partially compensate for angular misalignment between said first and second planes;
a first pair of half wedge members having front and back sides, disposed intermediate said first inclined surfaces of said base section and said top section, said half wedge members having oppositely inclined top and bottom faces abutting said first inclined surfaces of said top section and said base section, respectively;
a second pair of half wedge members having front and back sides, disposed intermediate said second inclined surfaces of said base section and said top section, said second pair of half wedge members having oppositely inclined top and bottom faces abutting said second inclined surfaces of said top section and said base section, respectively;
first and second brackets engaging said back sides of said first and second pairs of half wedge members, respectively;
a threaded rod longitudinally disposed intermediate said half wedge members, having a first end extending through an opening in said first bracket and a second end extending through an opening in said second bracket;
first and second nuts threadingly engaged on said first and second ends of said rod, whereby tightening and loosening one of said nuts causes said first and second pairs of half wedge members to longitudinally converge and diverge, respectively, longitudinal movement of said first and second pairs of half wedge members causing said top section to move vertically relative to said base section;
first and second laterally oriented pivot pins disposed intermediate said half wedge members, having opposite ends extending beyond the sides of said half wedge members; and
a plurality of vertical braces secured to said opposite ends of said pivot pins and disposed closely adjacent the sides of said half wedge members and said top and base sections, thereby prohibiting lateral movement of said half wedge members relative to said top and base sections.

* * * * *